(12) United States Patent
Sung et al.

(10) Patent No.: US 12,141,896 B2
(45) Date of Patent: Nov. 12, 2024

(54) APPARATUS FOR DISPLAYING ECO STATE OF VEHICLE

(71) Applicants: HYUNDAI MOTOR COMPANY, Seoul (KR); Kia Corporation, Seoul (KR); HYUNDAI AUTOEVER Corp., Seoul (KR)

(72) Inventors: Tae Hyun Sung, Seoul (KR); Bum Hee Chung, Seoul (KR); Joo Young Lee, Seoul (KR); Young Jun You, Seoul (KR); Jeong Hyeok Seo, Seoul (KR); Soo In Ko, Seoul (KR); Sung Eun Lim, Seoul (KR)

(73) Assignees: HYUNDAI MOTOR COMPANY, Seoul (KR); KIA CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 0 days.

(21) Appl. No.: 18/202,092

(22) Filed: May 25, 2023

(65) Prior Publication Data
US 2023/0298227 A1   Sep. 21, 2023

Related U.S. Application Data

(62) Division of application No. 17/466,494, filed on Sep. 3, 2021, now Pat. No. 11,699,251.

(30) Foreign Application Priority Data

Sep. 16, 2020  (KR) .................. 10-2020-0119045

(51) Int. Cl.
*G06T 11/00*      (2006.01)
*B60K 35/00*     (2024.01)
(Continued)

(52) U.S. Cl.
CPC ............ *G06T 11/001* (2013.01); *B60K 35/00* (2013.01); *G06F 18/24* (2023.01); *G06T 7/70* (2017.01);
(Continued)

(58) Field of Classification Search
None
See application file for complete search history.

(56) References Cited

U.S. PATENT DOCUMENTS 5,693,876 A * 12/1997 Ghitea, Jr. .............. G01F 9/023
                                                              340/439
7,237,203 B1 * 6/2007 Kuenzner .............. B60K 35/00
                                                              715/764
(Continued)

OTHER PUBLICATIONS https://dictionary.cambridge.org/us/dictionary/english/fuel-efficiency Definition "Fuel efficiency" Cambridge Dictionary.*
(Continued)

*Primary Examiner* — Jason A Pringle-Parker
(74) *Attorney, Agent, or Firm* — MORGAN, LEWIS & BOCKIUS LLP

(57) ABSTRACT

An information display apparatus may include a processor configured to display a display object in augmented reality; and a storage configured to store data and algorithms driven by the processor, wherein the processor determines a position of the display object by use of at least one of a total number of lanes or a number of lanes in a road in a driving direction of a host vehicle, possible traveling direction information for each lane, and driving direction information related to the host vehicle, and the information display apparatus is disposed within a vehicle or outside the vehicle, and when disposed outside the vehicle, is configured to transmit display information related to the display object to the vehicle or a mobile device.

4 Claims, 10 Drawing Sheets

(51) Int. Cl.
  *B60K 35/22*  (2024.01)
  *B60K 35/28*  (2024.01)
  *G06F 18/24*  (2023.01)
  *G06T 7/70*   (2017.01)
  *G06V 20/56*  (2022.01)

(52) U.S. Cl.
  CPC ............ *G06V 20/588* (2022.01); *B60K 35/22* (2024.01); *B60K 35/28* (2024.01); *B60K 2360/177* (2024.01); *B60K 2360/178* (2024.01); *G06T 2207/30256* (2013.01)

(56) References Cited

U.S. PATENT DOCUMENTS

| | | | |
|---|---|---|---|
| 9,318,018 B2 | 4/2016 | Park et al. | |
| 9,746,524 B2* | 8/2017 | Petrucelli ............ | H01M 10/486 |
| 9,904,287 B1 | 2/2018 | Kuffner et al. | |
| 9,969,267 B2 | 5/2018 | McNew | |
| 10,710,571 B2* | 7/2020 | Kim .................... | B60W 30/188 |
| 2005/0192736 A1 | 9/2005 | Sawada et al. | |
| 2009/0157267 A1* | 6/2009 | Shin .................. | B60W 50/0098 |
| | | | 701/70 |
| 2009/0251304 A1* | 10/2009 | Saito ..................... | F02B 77/084 |
| | | | 340/441 |
| 2009/0326753 A1* | 12/2009 | Chen ........................ | G09B 9/04 |
| | | | 701/31.4 |
| 2010/0052888 A1* | 3/2010 | Crowe .................. | B60W 10/08 |
| | | | 340/461 |
| 2010/0332241 A1* | 12/2010 | Boss ...................... | G06Q 10/06 |
| | | | 705/1.1 |
| 2011/0112717 A1* | 5/2011 | Resner ............. | G08G 1/096725 |
| | | | 701/31.4 |
| 2011/0205043 A1* | 8/2011 | Fujiki .................. | G09B 19/167 |
| | | | 340/439 |
| 2012/0139922 A1* | 6/2012 | Heo ....................... | B60K 35/00 |
| | | | 345/440 |
| 2013/0090821 A1* | 4/2013 | Abboud ................. | G07C 5/085 |
| | | | 701/123 |
| 2013/0158849 A1* | 6/2013 | Maura ................ | G01C 21/3697 |
| | | | 701/123 |
| 2014/0070932 A1* | 3/2014 | Prasad ................... | G02B 27/01 |
| | | | 340/438 |
| 2014/0129092 A1* | 5/2014 | Mori ...................... | B60K 37/06 |
| | | | 701/49 |
| 2015/0084988 A1 | 3/2015 | Lee | |
| 2015/0204687 A1 | 7/2015 | Yoon et al. | |
| 2015/0353034 A1* | 12/2015 | Jang ....................... | G07C 5/004 |
| | | | 701/101 |
| 2015/0363087 A1* | 12/2015 | Lee ..................... | G06F 3/04847 |
| | | | 715/771 |
| 2015/0379776 A1* | 12/2015 | Ito ............................ | G01D 7/04 |
| | | | 345/419 |
| 2016/0300408 A1* | 10/2016 | Dudar .................... | G07C 5/008 |
| 2017/0161009 A1 | 6/2017 | Ogisu et al. | |
| 2017/0227639 A1* | 8/2017 | Stokes ................. | G01S 7/6272 |
| 2017/0365101 A1 | 12/2017 | Samec et al. | |
| 2018/0137373 A1 | 5/2018 | Rasmusson et al. | |
| 2018/0157036 A1 | 6/2018 | Choi et al. | |
| 2018/0328752 A1 | 11/2018 | Tomatsu et al. | |
| 2019/0005726 A1 | 1/2019 | Nakano et al. | |
| 2019/0049724 A1 | 2/2019 | Kimura et al. | |

OTHER PUBLICATIONS

Notice of Allowance issued in corresponding U.S. Appl. No. 17/466,494 issued Mar. 22, 2023.

Office Action issued in corresponding U.S. Appl. No. 17/466,494 issued Oct. 24, 2022.

* cited by examiner

APPARATUS FOR DISPLAYING ECO STATE OF VEHICLE

CROSS-REFERENCE TO RELATED APPLICATION

The present application is the divisional application of U.S. patent application Ser. No. 17/466,494, filed on Sep. 3, 2021, which claims priority to Korean Patent Application No. 10-2020-0119045, filed on Sep. 16, 2020, the entire contents of which are incorporated herein for all purposes by this reference.

BACKGROUND OF THE PRESENT INVENTION

Field of the Invention

The present invention relates to an information display apparatus based on augmented reality, and more particularly, to a technique for supplementing a reference position and displaying additional information based on augmented reality.

Description of Related Art

In general, vehicles (means of transportation) have become essential products in a modern society as their mobility and usability are improved by applying advanced technique, and recently, a head-up display (HUD) has been used to project information onto driver's eyes.

The head-up display is a front display device designed to display driving information related to a means of transportation on front glass of the means of transportation. That is, a head-up display unit is displayed by forming a virtual image such that a driver can recognize various types of information, such as a speed, a fuel level, a temperature, and a warning direction displayed on a vehicle cluster, on windshield glass.

Furthermore, a navigation system is mounted on a recent means of transportation to provide a destination and directions to a driver, and furthermore, in the navigation system to which augmented reality is applied, specific information may be displayed in a form of augmented reality. However, accuracy and diversity of information provided by use of augmented reality in the navigation system is poor.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an information display apparatus based on augmented reality configured for displaying vehicle information in an augmented reality form by selecting an accurate position in an environment where a precise map or precise positioning is not available.

Furthermore, of the present invention an exemplary embodiment of the present invention is directed to providing an information display apparatus based on augmented reality configured for providing a user with additional information which is mapped with the real world based on augmented reality.

The technical objects of the present invention are not limited to the objects mentioned above, and other technical objects not mentioned may be clearly understood by those skilled in the art from the description of the claims.

Various aspects of the present invention are directed to providing an information display apparatus, including: a processor configured to display a display object in augmented reality; and a storage configured to store data and algorithms driven by the processor, wherein the processor determines a position of the display object by use of at least one of a total number of lanes or a number of lanes in a road in a driving direction of a host vehicle, possible traveling direction information for each lane, and driving direction information related to the host vehicle, and the information display apparatus is disposed within a vehicle or outside the vehicle, and when disposed outside the vehicle, is configured to transmit display information related to the display object to the vehicle or a mobile device.

In various exemplary embodiments of the present invention, the processor may determine the position of the display object by moving a reference position on a general map from a lane on which the host vehicle is traveling to a lane corresponding to the driving direction of the host vehicle by use of the possible traveling direction information for each lane.

In various exemplary embodiments of the present invention, the processor may display the display object in a lane having a same driving direction as the driving direction of the host vehicle, and does not display the display object in a lane having a direction opposite to the driving direction of the host vehicle.

In various exemplary embodiments of the present invention, the processor may determine a moving distance based on the total number of lanes in the case of a road in which there is no distinction between directions of going up and down on a map, and may determine a moving distance by use of at least one of the total number of lanes in the driving direction thereof, the number of lanes in the driving direction thereof, and the number of lanes in a direction opposite to the driving direction thereof, and determines the position of the display object by moving the reference position on the general map by the moving distance in the case of a road in which there is distinction between directions of going up and down on the map.

In various exemplary embodiments of the present invention, the processor may determine a moving distance according to the total number of lanes and lane widths in the case of a road in which there is no distinction between directions of going up and down on a map, and may determine a moving distance by use of the lane widths and at least one of the total number of lanes in the driving direction thereof, the number of lanes in the driving direction thereof, and the number of lanes in a direction opposite to the driving direction thereof, and determines the position of the display object by moving the reference position on the general map by the moving distance in the case of a road in which there is distinction between directions of going up and down on the map.

In various exemplary embodiments of the present invention, the processor may determine a moving direction of the reference position in consideration of a vehicle driving direction for each country.

In various exemplary embodiments of the present invention, the processor may estimate a width of another lane by use of a lane width of a lane on which the host vehicle is currently traveling, or may determine widths of at least one lane in the driving direction of the host vehicle on a road on which the host vehicle is traveling, and then estimates an average value of the measured widths of the at least one lane as the each lane width.

In various exemplary embodiments of the present invention, the processor may determine the moving distance of the reference position by determining the lane width as a predetermined value and using the number of lanes and the lane widths when unable to estimate a lane width of a lane on which the host vehicle is traveling.

In various exemplary embodiments of the present invention, the processor may determine an average value of the lane width by use of remaining lane widths excluding a lane width which is outside a predetermined reference range when a measured value of each lane is outside the reference range after measuring the widths of the at least one lane.

Various aspects of the present invention are directed to providing an information display apparatus, including: a processor configured to display an eco state of a vehicle based on augmented reality; and a storage configured to store data and algorithms driven by the processor, wherein the processor is configured to classify and display display objects depending on the eco state, and the information display apparatus is disposed within a vehicle or outside the vehicle, and when disposed outside the vehicle, is configured to transmit display information related to the eco state to the vehicle or a mobile device.

In various exemplary embodiments of the present invention, the processor may classify and display at least one of color, shape, type, and size of the display objects depending on the eco state.

In various exemplary embodiments of the present invention, the processor may determine the eco state by comparing fuel efficiency of other vehicles and fuel efficiency of the host vehicle based on a same vehicle model or a same condition as the host vehicle.

In various exemplary embodiments of the present invention, the another vehicle may include at least one of all vehicles within a certain radius or satisfying a certain condition, all vehicles in a same country based on a same vehicle type, and vehicles designated with consent of a user.

In various exemplary embodiments of the present invention, the processor may determine the eco state depending on a battery usage state of the vehicle.

Various aspects of the present invention are directed to providing an information display apparatus, including: a processor configured to display regional boundary information based on augmented reality; and a storage configured to store data and algorithms driven by the processor, wherein the processor is configured to display an object representing a regional boundary, upon determining that the regional boundary information exists, and the information display apparatus is disposed within a vehicle or outside the vehicle, and when disposed outside the vehicle, is configured to transmit display information related to the regional boundary information to the vehicle or a mobile device.

In various exemplary embodiments of the present invention, the regional boundary information may include at least one of information related to an area where the host vehicle is currently positioned or information related to a new area which the vehicle newly enters.

In various exemplary embodiments of the present invention, the object representing the regional boundary information may include at least one of a national flag, a country name, a national bird, a national flower, a regional symbol, a region name, and a byword.

In various exemplary embodiments of the present invention, the processor may display the object representing the regional boundary thereof within a predetermined distance before or after passing through the regional boundary thereof.

Various aspects of the present invention are directed to providing an information display apparatus, including: a processor configured to display a display object in augmented reality; and a storage configured to store data and algorithms driven by the processor, wherein the processor provides at least one display method for displaying the display object to a user, and receives the at least one display method selected by the user to apply the at least one display method, and the information display apparatus is disposed within a vehicle or outside the vehicle, and when disposed outside the vehicle, is configured to transmit the display method inputted from the user to the vehicle or a mobile device.

In various exemplary embodiments of the present invention, the processor may receive selection of whether to display each function of functions provided by the augmented reality, which is made by the user, to apply each function.

The present technique may minimize the sense of heterogeneity by accurately determining and displaying an object display position when displaying vehicle information based on augmented reality.

Furthermore, the present technique may increase user convenience by providing information related to an area that could not be previously displayed and additional information which is matched with the real world based on augmented reality to the user.

Furthermore, various effects which may be directly or indirectly identified through the present document may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
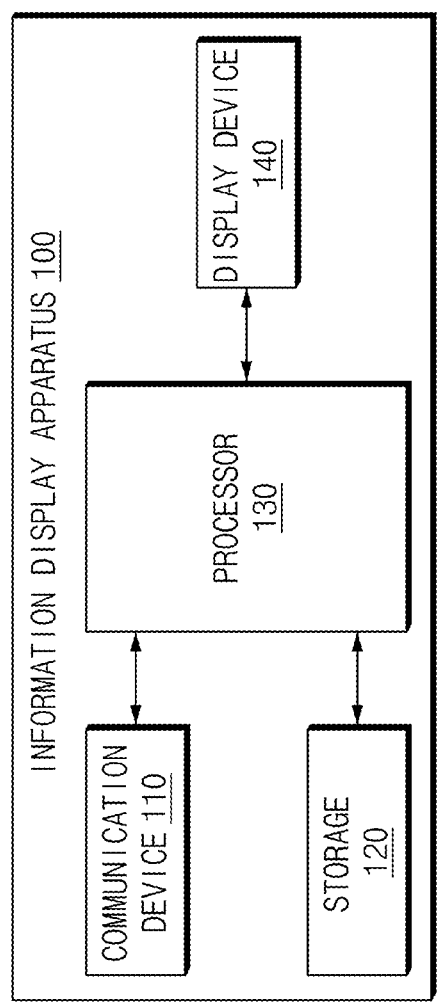
FIG. 1A illustrates a block diagram showing a configuration of an information display apparatus based on augmented reality according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, some exemplary embodiments of the present invention will be described in detail with reference to exemplary drawings. It may be noted that in adding reference numerals to constituent elements of each drawing, the same constituent elements have the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the Field of the Invention to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the exemplary embodiment of the present invention.

Hereinafter, various exemplary embodiments of the present invention will be described in detail with reference to FIG. 1A to FIG. 5C.

FIG. 1A illustrates a block diagram showing a configuration of an information display apparatus according to various exemplary embodiments of the present invention.

The information display apparatus of the present invention may be applied to all means of transportation, and the means of transportation may include a four-wheeled means of transportation, such as a vehicle or a truck, a two-wheeled means such as a motorcycle or a bicycle, and all movable means such as an aircraft or a ship, the information display apparatus may display information such as a destination, a stopover area, a point of interest (POI), and a driving state of a means of transportation, and may be implemented as a navigation system, an audio video navigation (AVN), or the like.

Figure 1B:
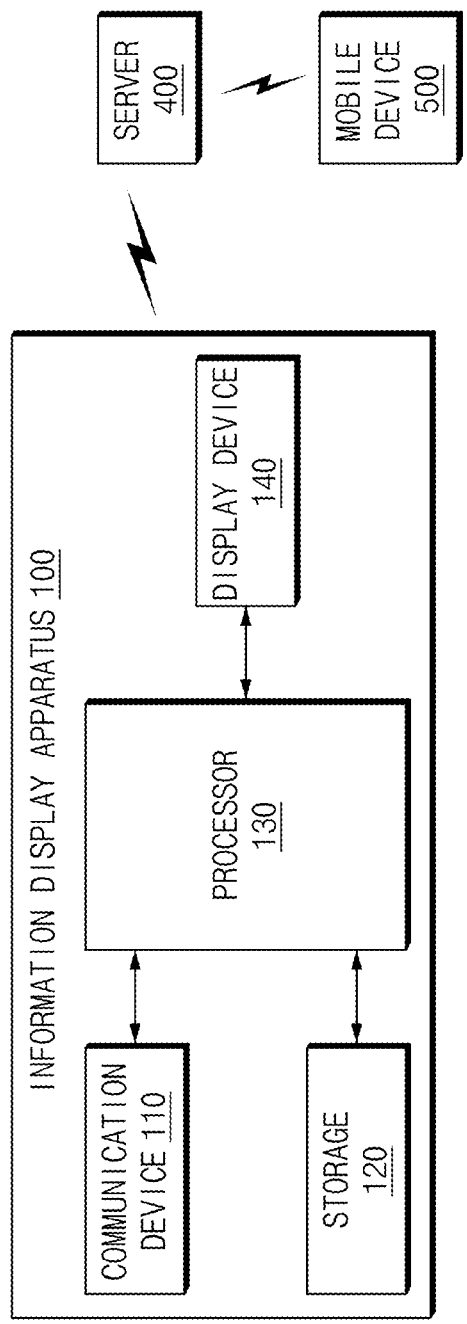
FIG. 1B illustrates a block diagram showing a configuration of an information display device based on augmented reality according to various exemplary embodiments of the present invention.

Referring to FIG. 1A, according to various exemplary embodiments of the present invention, the display information apparatus 100 may be implemented inside the means of transportation. In the instant case, the information display apparatus 100 may be integrally formed with internal control units of the means of transportation, and may be implemented as a separate device to be connected to the control units of the means of transportation by a separate connecting means. Furthermore, the information display apparatus 100 may be configured in a form of a server 400 outside the means of transportation as illustrated in FIG. 1B, and outside the means of transportation, the server 400 transmits driving information to the in-vehicle display or a mobile device 500 to display it based on augmented reality. That is, the server 400 may receive vehicle control information (collision warning information or inter-vehicle distance control information, etc.) in connection with an in-vehicle forward collision warning (FCW) system, a smart cruise control (SCC) system, and the like, to transmit vehicle information corresponding thereto to the in-vehicle information display apparatus 100. In the instant case, the mobile device 500 may include all mobile communication terminals having a display device, such as a smart phone, a personal digital assistant (PDA), a portable multimedia player (PMP), a digital camera, a portable game machine, an MP3 player, a smart key, a tablet PC, as a user terminal. When driving information is transmitted from an outside of the vehicle to the means of transportation, it may be transmitted from a device or a server outside the vehicle to an in-vehicle device, and the in-vehicle device may include, e.g., a cluster, a head-up display, a navigation terminal, an audio, a video, a navigation (AVN), and the like.

Furthermore, the information display apparatus 100 in various exemplary embodiments of the present invention may be applied to autonomous driving control vehicles, such as advanced driver assistance systems (ADAS), smart cruise control (SCC) systems, and forward collision warning (FCW) systems, and may display information which is received through transmission/reception with respect to the ADAS, the SCC systems, the FCW systems, or the like, based on augmented reality.

According to the exemplary embodiment of the present invention, the information display apparatus 100 which is operated as the above may be implemented in a form of an independent hardware device including a memory and a processor that processes each operation, and may be driven in a form included in other hardware devices such as a microprocessor or a general purpose computer system.

Referring to FIG. 1A, the information display apparatus 100 of the means of transportation may include a communication device 110, a storage 120, and a processor 130, and a display device 140.

The communication device 110, which is a hardware device implemented with various electronic circuits to transmit and receive signals through a wireless or wired connection, may perform V2I communication by use of an in-vehicle network communication technique or a wireless Internet access or short range communication technique with servers, infrastructure, and other vehicles outside the vehicle in various exemplary embodiments of the present invention. Herein, in-vehicle communication may be performed through controller area network (CAN) communication, local interconnect network (LIN) communication, or flexray communication as the in-vehicle network communication technique. Furthermore, the wireless communication technique may include wireless LAN (WLAN), wireless broadband (Wibro), Wi-Fi, Worldwide Interoperability for Microwave Access (WiMAX), etc. Furthermore, short-range communication technique may include Bluetooth, ZigBee, ultra wideband (UWB), radio frequency identification (RFID), infrared data association (IrDA), and the like.

As an example, the communication device 110 may receive traffic information, road information, vehicle information for display based on augmented reality, and the like from an external server 400. As an example, vehicle information for display based on augmented reality may include corrected reference position information, vehicle eco state information, regional boundary information, augmented reality function or method information selected by a user, and the like.

The storage 120 may store information received by the communication device 110, data obtained by the processor 130, data and/or algorithms required for the processor 130 to operate, and the like. As an example, the storage 120 may store corrected reference position information, vehicle eco state information, regional boundary information, augmented reality function or method information selected by a user, and the like.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, may electrically control each component, and may be an electrical circuit that executes software commands, performing various data processing and calculations described below. The processor 130 may be, e.g., an electronic control unit (ECU), a micro controller unit (MCU), or other sub-controllers mounted in the means of transportation.

When a display object is displayed based on augmented reality, the processor 130 may determine a position of the display object by correcting a reference position on a general map by use of at least one of a total number of lanes or a number of lanes in a road in a driving direction of a host vehicle, direction information for each lane, driving direction information related to the host vehicle.

Furthermore, when passing through a region (or country) while driving, the processor 130 may display regional boundary information based on augmented reality.

The processor 130 may determine an eco state of the vehicle and display the eco state of the vehicle based on the augmented reality.

The processor 130 may provide at least one display method for displaying a display object to a user, and may select and apply the at least one display method from the user.

A navigation system such as a navigation may use a precise map or precise positioning to determine a current position, but may determine a position of a display object and display it based on augmented reality by use of a general navigation map or general navigation positioning instead of the precise map or the precise positioning due to limitations in cost or technique.

Accordingly, since the display position of the object is incorrect, accuracy of augmented reality display information may decrease and usability thereof may decrease, and thus when the vehicle information is displayed in augmented reality, the processor 130 in various exemplary embodiments of the present invention selects the position of the object based on the total number of lanes of the object, the number of lanes for the driving direction thereof, possible traveling direction information for each lane using lane guidance information, and whether there is a lane having a same direction as a driving direction of the host vehicle, and makes it possible to accurately display the position of the display object by determining the driving direction thereof. In the instant case, the display object includes objects for display such as a host vehicle, a vehicle ahead, a target vehicle, a dynamic wall, and an obstacle.

First, the processor 130 may select a display position by determining a moving distance of the display object based on the total number of lanes or the number of lanes in the driving direction thereof. In many cases, a reference position on a map for displaying the display object is a center line of the road in an environment where a precise map is not provided or precise positioning is not available, that is, in an environment where a general map or general positioning may be used.

Accordingly, in an environment where a precise map is not provided or precise positioning is not available, the processor 130 may select an accurate display position by determining a moving distance for correcting the reference position in consideration of the total number of lanes or the number of lanes for the driving direction thereof, and may display the display object (e.g., dynamic wall) based on a corresponding display position.

To the present end, the processor 130 may determine a moving distance and a moving direction for moving the reference position to correct the reference position.

First, the processor 130 may determine that a current driving road is a two-way road when both forward and backward values in link traffic information related to a current driving road are open.

In the case of a road in which there is no distinction between going up and down on a map, the processor 130 determines the moving distance based on the total number of lanes, while in the case of a road in which there is a distinction between going up and down on a map, the processor 130 may determine a moving distance by use of at least one of the total number of lanes in the driving direction, the number of lanes in the driving direction, and the number of lanes in an opposite direction, and may determine a position of the display object by moving the reference position on the general map by the moving distance.

Furthermore, in the case of the road in which there is no distinction between going up and down on the map, the processor 130 determines the moving distance based on the total number and width of lanes, while in the case of a road in which there is no distinction between going up and down on a map, the processor 130 may determine a moving distance by use of the width of lanes and at least one of the total number of lanes in the driving direction, the number of lanes in the driving direction, and the number of lanes in an opposite direction, and may determine a position of the display object by moving the reference position on the general map by the moving distance.

When the current driving road has no distinction between going up and down, the processor 130 may determine a moving distance for moving from the reference position on a map based on a width of lanes and a predetermined number of lanes (e.g., ½ of the total number of lanes) compared to the total number of lanes in consideration of the total number of lanes. That is, the processor 130 may determine a moving distance for moving the reference position as shown in Equation 1 in the case of a road in which there is no distinction between going up and down.

Moving distance=total lanes/4*lane width (Equation 1)

In the instant case, the total number of lanes indicates a number of lanes of an entry link at an intersection, and the lane width may be estimated by measuring a lane width of the host vehicle or may be set to a predetermined value. A method for estimating the lane width will be described later in detail.

For example, when the number of lanes on a road in which there is no distinction between going up and down is four, the processor 130 may determine the moving distance by multiplying the second lane, which is half of the fourth lane, and the lane width per lane. For example, when the lane width is 2.7 m, the moving distance is obtained as 5. 2M by multiplying it by 2. Accordingly, the processor 130 may move the reference position on the map by 2.7 m.

On the other hand, the processor 130 may determine the moving distance by use of the lane width and at least one of the total number of lanes, the number of lanes in the driving direction, and the number of lanes in a direction opposite to the driving direction in the case of a road in which there is a distinction between going up and down on the map. The processor 130 may determine the moving distance by use of Equation 2 in the case of the road in which there is a distinction between going up and down on the map.

Moving distance=(total number of lanes−number of lanes in driving direction+number of pocket lanes)/2*lane width (Equation 2)

In the instant case, the total number of lanes and the number of lanes in the driving direction are a number of lanes of the entry link at the intersection.

For example, when the total number of lanes is 6 lanes and the number of pocket lanes is 2, the reference position depending on the general map is provided at a center line, 3 lanes, which are the number of lanes in the driving direction of the host vehicle, are subtracted from the 6 lanes, and the 2 pocket lanes add up to become 5, and the reference position may be selected as the position of the display object by moving the reference position by a value obtained by multiplying the 2.5 lanes, which is ½ of 5, by the lane width.

For example, when 4 of 8 round-trip lanes that are currently driving are in the driving direction and the lane width is 3 meters, a point where the reference position is moved by 6 meters may be selected as the position of the display object by multiplying 2 lanes, which are half of the four lanes, which are the number of driving lanes relative to the total number of lanes on the map, by 3, which is the width of each lane.

The present invention includes an example of determining the moving distance by multiplying the determined number of lanes by the lane width, but the present invention is not limited thereto.

Figure 2:
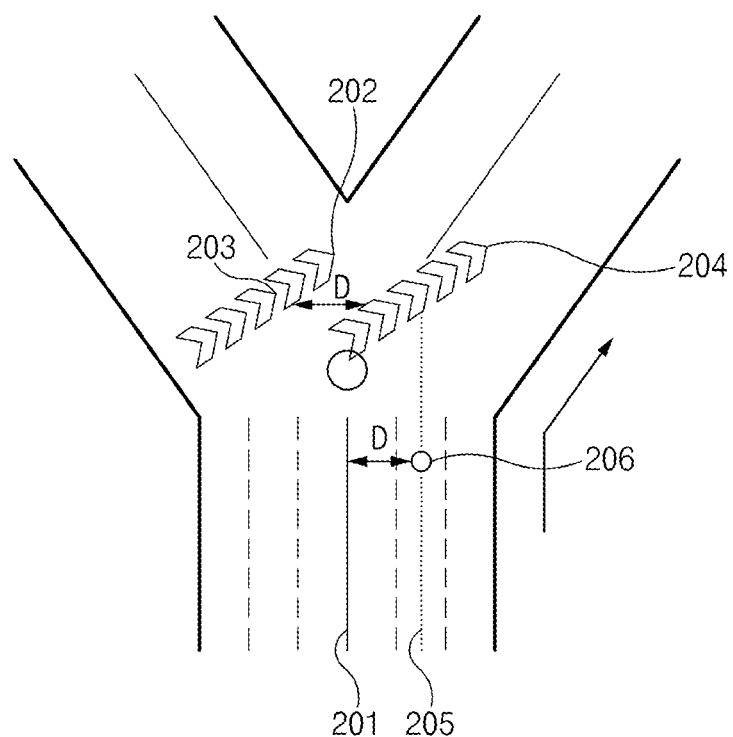
FIG. 2 illustrates a view for describing reference position supplement based on augmented reality according to various exemplary embodiments of the present invention.

FIG. 2 illustrates a view for describing reference position supplement based on augmented reality according to various exemplary embodiments of the present invention.

Referring to FIG. 2, when a reference position on a general map is positioned at a road center line 201 to display a dynamic wall 203 based on the reference position on the general map, an end point 202 of the dynamic wall 203 is positioned at the reference position.

Accordingly, a moving distance D is determined by obtaining 1.5 lanes by dividing 6 lanes by 4 and multiplying 1.5 by the lane width, and a dynamic wall 204 is positioned at a center line 205 of a driving lane. The dynamic wall 203 moves as much as D, which is the distance from the road center line 201 to the center line 205 of the driving lane, and finally the dynamic wall 204 is positioned at the center line 205 of the driving lane.

Furthermore, the processor 130 may determine a moving direction of the reference position in consideration of a vehicle driving direction for each country. The processor 130 may determine a moving direction as a direction of a lane in which a host vehicle is traveling based on a road link. For example, when the road link is based on right traffic, the reference position may be moved in a right direction thereof, and when the road link is based on left traffic, the reference position may be moved in a left direction thereof.

The processor 130 may determine the position of the display object using guidance information for each lane on the map in an environment where a precise map is not provided or precise positioning is not available.

For example, in the case where the total number of lanes currently driving is four lanes one-way including a left turn lane, a first straight lane, a second straight lane, and a right turn lane, when the driving direction of the host vehicle is a forward direction thereof, the position of the display object may be determined by moving the reference position on the map by as many as two lanes corresponding to the forward direction among all four lanes. That is, the position of the display object is a reference position on the general map, and the reference position on the general map is inaccurate and is located at a center line and not a precise lane, and when a current traveling path of the host vehicle is to turn left, the host vehicle may be positioned in the left turn lane, and thus the position of the display object may be selected by moving from the reference position to the right by one lane.

Furthermore, when the display object is displayed based on augmented reality, the processor 130 may display the display object only within a lane of the same driving direction as the driving direction of the host vehicle. That is, the processor 130 does not display the display object on a driving lane in the opposite direction thereof.

For example, when expressing an animal object such as a group moving, a corresponding animal object may be represented within a lane having the same driving direction as the driving direction of the host vehicle. For example, a dolphin swims in the same direction as the host vehicle, and swims in a lane next thereto, which is running in the same direction thereof, but is not displayed in a lane in the opposite direction beyond the center line, and thus the display object may be displayed only in the lanes in the driving direction of the host vehicle.

The processor 130 may estimate a width of another lane by use of a lane width of a lane on which the host vehicle is currently traveling. That is, when moving the reference position on the map, the processor 130 may estimate a distance (moving distance) to which the reference position should be moved based on a number of lanes, by use of a width of the current driving lane or a width of a measurable lane.

When a width of several lanes may be measured at a same time, the processor 130 may perform the estimation by excluding or including a case where there is a specific value (e.g., too narrow or wide) among them. For example, when only the width of the current driving lane may be measured, it may be estimated that the width of the current driving lane and a width of another lane are the same. Furthermore, as an example, when three lanes based on the host vehicle may be measured, the processor 130 may estimate a width of another lane by use of the average value of all lanes (three lanes).

Furthermore, as an example, the processor 130 measures widths of three lanes based on the own vehicle, but when one lane is too narrow, an average value of the two lanes may be determined to estimate widths of the other lanes. However, when the host vehicle is unable to estimate the width of the driving lane, the processor 130 may determine a moving distance for moving the reference position by determining the lane width as a predetermined value (e.g., 2.7 m), and using the number of lanes and the predetermined lane width.

The processor 130 may display ECO information based on augmented reality.

That is, the processor 130 may differently express a color, size, shape, etc. of the display object depending on a change in an eco state of the vehicle based on augmented reality. For example, it is possible to display the eco state by dividing it by colors of a carpet.

Figure 3A:
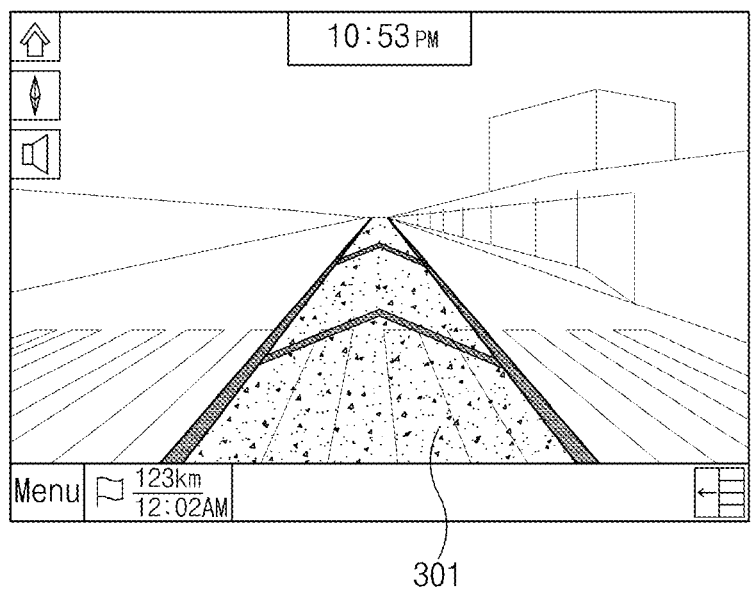
FIG. 3A, FIG. 3B and FIG. 3C illustrate an example of differently displaying a color of a carpet depending on a vehicle state based on augmented reality according to various exemplary embodiments of the present invention.
Figure 3B:
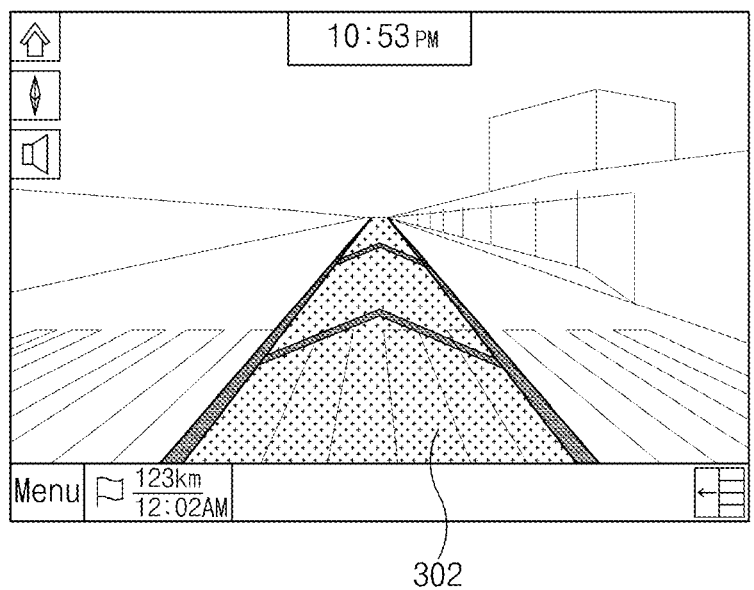
Figure 3C:
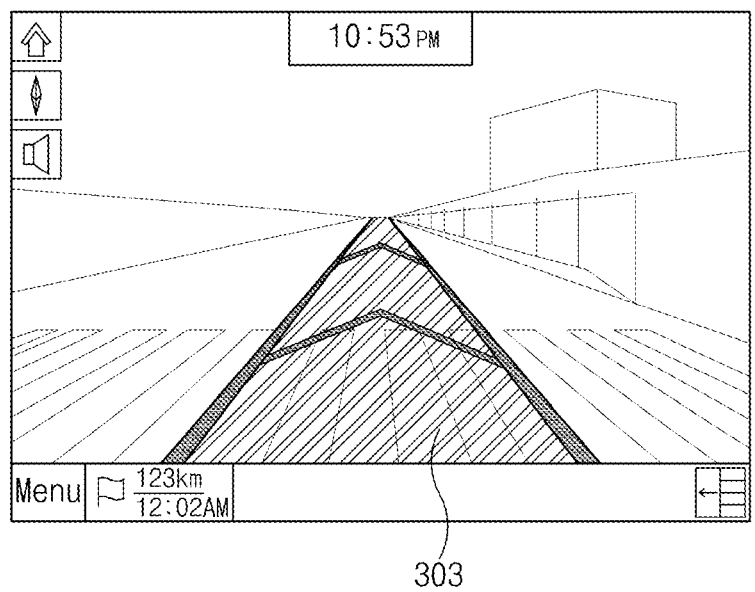
Figure 4:
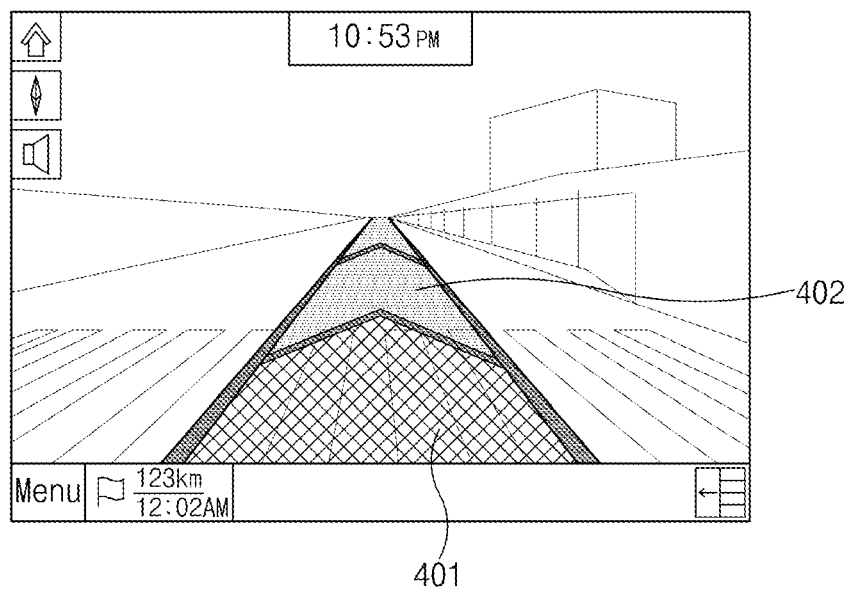
FIG. 4 illustrates an example of displaying a color of a carpet in a stepwise manner depending on a vehicle state based on augmented reality according to various exemplary embodiments of the present invention.

FIG. 3A, FIG. 3B and FIG. 3C illustrate an example of differently displaying a color of a carpet depending on a vehicle state based on augmented reality according to various exemplary embodiments of the present invention. FIG. 4 illustrates an example of displaying a color of a carpet in a stepwise manner depending on a vehicle state based on augmented reality according to various exemplary embodiments of the present invention.

As an example in which colors for each state are classified and displayed, FIG. 3A illustrates a color of a carpet 301 when the eco-state of the vehicle is "High," FIG. 3B illustrates a color of a carpet 302 when the eco state is "Medium," and FIG. 3C illustrates a color of a carpet 303 when the eco state is "Low."

In FIG. 4, as an example in which colors are classified and displayed in the carpet step by step depending on the eco state, even when the eco state is "High," the carpet is not displayed in one green color depending on a degree thereof, and a green color 401 and a blue color 402 may be used to indicate the color of the carpet. For example, in the case where the eco state is 80 or higher, the carpet may be displayed in blue when the eco status is "90", the carpet may be displayed in green and blue colors together when the eco state is 85, and the carpet may be displayed in green when the eco state is 80, so that the eco state may be further subdivided and displayed.

Although not illustrated, when the eco state is "Medium," the color of the carpet may be displayed in combination with green and orange, and when the eco state is "Low," the color of the carpet may be displayed in combination with orange and red.

Furthermore, the processor 130 may display an economical state (ECO state) by use of an animal or plant based on augmented reality. For example, when the eco-state of the vehicle is "High", an animation of a dolphin swimming in the same direction as the driving direction may be applied, when the eco state is "Medium", an animation of a rabbit running may be applied, and when the eco state is "Low," an animate of a turtle crawling may be applied.

The processor 130 may determine an eco state depending on current average fuel efficiency or instantaneous fuel efficiency of the host vehicle to display eco information.

That is, the processor 130 may determine a current driving state as the economical mode (i.e., eco mode) when the average or instantaneous fuel efficiency of the host vehicle exceeds official fuel efficiency of the corresponding vehicle.

Furthermore, the processor 130 may determine the eco state of the host vehicle through fuel efficiency comparison with another vehicle to display the eco information. That is, the processor 130 may determine whether or not the vehicle is in the eco state through the fuel efficiency comparison with another vehicle based on a same vehicle type or a same option. In the instant case, the another vehicle may include at least one of all vehicles within a certain radius or satisfying a certain condition (e.g., all vehicles driving on the road which is the host vehicle is currently driving), all vehicles in a same country based on a same vehicle type, and vehicles designated with consent of a user.

In an exemplary embodiment of the present invention, the certain radius is a predetermined radius from the host vehicle.

For example, when a current vehicle model is K7, the eco state may be determined by comparing average fuel efficiency of all K7 models in use with average fuel efficiency of the host vehicle. In the instant case, the instantaneous fuel efficiency may be used instead of the average fuel efficiency.

For example, when a current vehicle model has 8-speed automatic transmission 3.0 of K7, fuel efficiency of a current vehicle may be compared with fuel efficiency based on a vehicle model option.

The processor 130 may determine the eco state depending on a battery usage state to display eco information. In the instant case, the battery use state may be classified into a normal mode (normal, no battery use, e.g., driving of an internal combustion engine), a using mode (using, battery use), and a charging mode (charging, battery charging).

The processor 130 may differentiate and display colors and sizes of display objects (e.g., carpets, battery-shaped objects, etc.) for each state in the augmented reality according to the battery usage state of the vehicle.

Accordingly, as the processor 130 expresses eco information in augmented reality, it is easy for a user to recognize a current driving state, and in some cases, a separate animation is applied to increase an aesthetic effect to induce a user's desire to improve vehicle fuel efficiency, improving vehicle fuel efficiency.

In an existing navigation system, it is difficult to provide the user with a sense of reality by displaying boundaries of regions on map information in a limited manner, and thus the processor 130 in various exemplary embodiments of the present invention may display regional boundary information based on augmented reality so that the user can more easily recognize a change in a driving environment when passing through the boundaries of the regions.

The processor 130 may display regional boundary information based on the augmented reality.

The processor 130 displays map information using augmented reality and positions information related to the host vehicle. The processor 130 may use regional information and regional boundary information provided by the map, but when there is a separate recognition device and recognizable information, it may clarify regional boundary classification using them.

Figure 5A:
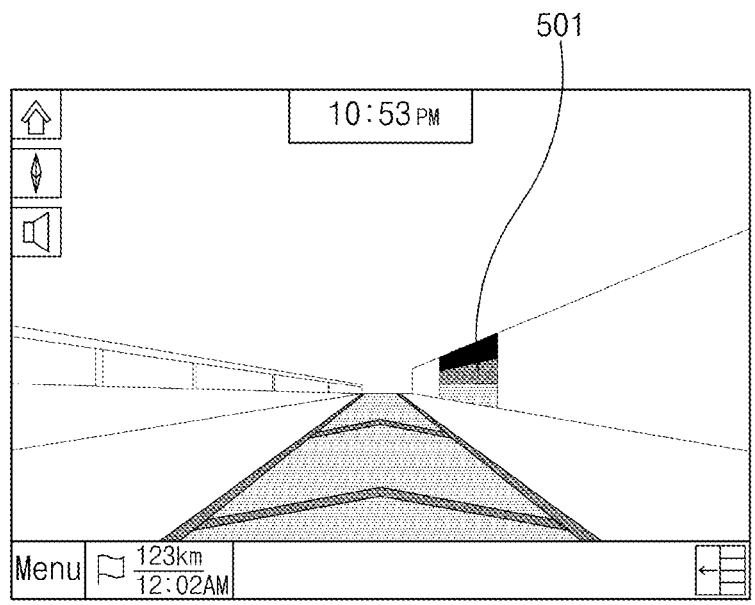
FIG. 5A, FIG. 5B and FIG. 5C illustrate an example of displaying regional boundary information based on augmented reality according to various exemplary embodiments of the present invention.
Figure 5B:
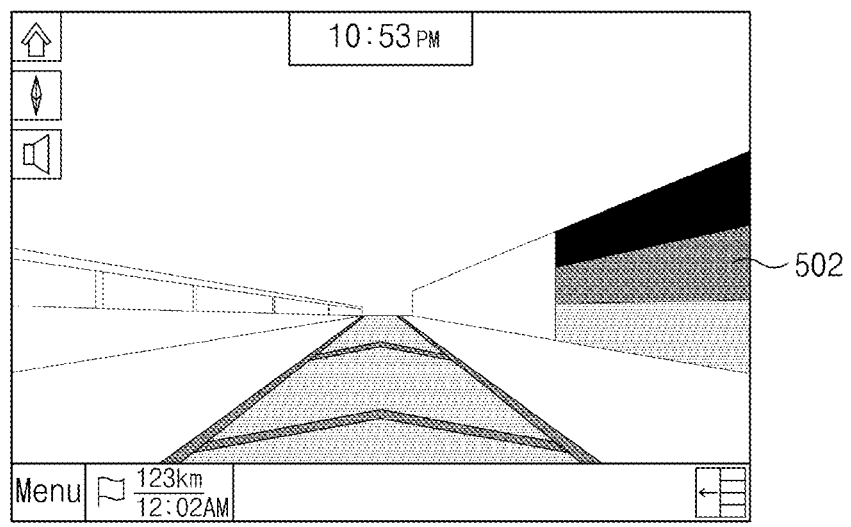

When a national boundary is moved, the processor 130 may display the national boundary based on augmented reality by use of at least one of a flag of a corresponding region representing an administrative unit such as a country, a region name, and a symbol that can symbolize the region. For example, a symbol that can symbolize a region include a comprehensive concept that symbolizes the region, and in the case of a country, it includes a coat of arms, a crest, a national flag, a country name, and a national bird and a national flower of each country, and the border may be displayed based on augmented reality. FIG. 5A illustrates an example of displaying a flag 501 of a country to be entered later, and FIG. 5B illustrates an example of displaying a flag 502 of a current country before crossing a border.

Furthermore, the processor 130 may display regional boundaries based on augmented reality by use of at least one of symbols, region names, and bywords that can symbolize a corresponding region to separate regions other than administrative units. For example, in the case of a hazardous area, a name of the hazardous area may be used, or a commonly used name may be indicated.

Furthermore, the processor 130 may display any one or more of information related to an area where it is currently positioned or information related to a new area which it newly enters as information on the regional boundaries. For example, a flag of a current country is displayed before passing through a national border thereof, and a flag of a corresponding country is displayed after passing through a national border thereof.

Figure 5C:
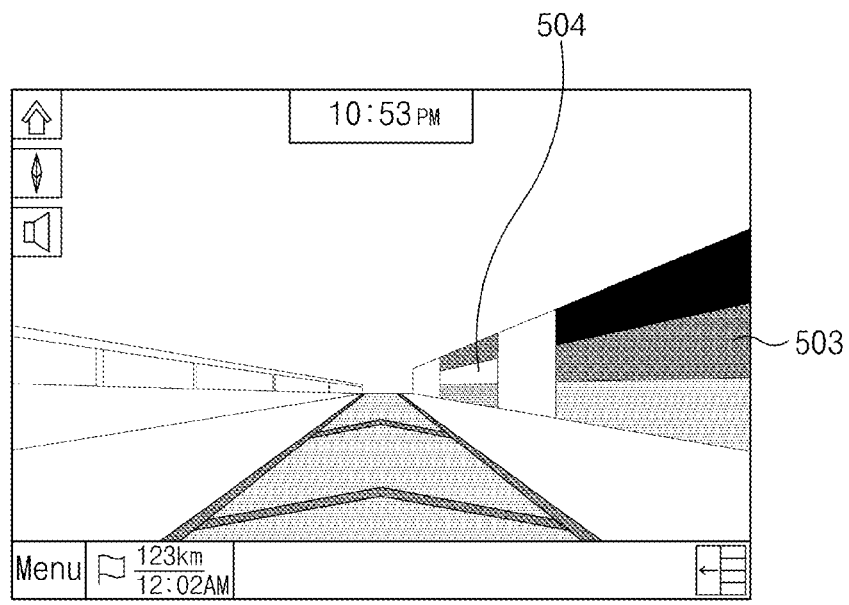

FIG. 5C illustrates an example in which a flag 503 of a current country is displayed and a flag 504 of a country that it enters later is displayed when a country border thereof is moved according to various exemplary embodiments of the present invention.

Accordingly, if necessary, the processor 130 displays information related to a corresponding area from in front thereof with a predetermined distance before passing through a regional boundary, or displays the information related to the area within a predetermined distance after passing through the area boundary. For example, flag information related to the country may be displayed at 100 m intervals from 500 m before passing the national border, and the national flag may be displayed at 100 m intervals up to 500 m after passing the national border.

Accordingly, the processor 130 displays a boundary of a region in augmented reality so that a user can easily recognize a change in a driving environment when passing the boundary of the region.

When the augmented reality is applied, the processor 130 may change expression concept depending on a setting for each function. When a display object is expressed in the augmented reality, at least one method or function for expressing the corresponding object is provided so that a user can select and apply one of at least one method or function. In the instant case, a target to be selected may be an entire or portion of a function provided as augmented reality.

For example, the processor 130 may provide a setting for carpet display provided as augmented reality in three-ways, and when a setting other than the default setting is applied, may receive a change in a color or shape, etc. of a carpet from a user, to display the carpet in a different manner.

The processor 130 may determine whether to display each function in the augmented reality function depending on the setting. That is, since the processor 130 may provide a function to turn on/off some of various functions provided by augmented reality. However, some functions may be provided by default, so on/off functions are not provided.

As an example, the processor 130 may turn on or off a lane departure warning provided as augmented reality for safety in the setting, but the carpet display does not provide the on/off function.

Accordingly, user convenience may be increased by providing a user with an authority to select whether to display each function in the augmented reality function.

The display device 140 is controlled by the processor 130 to display vehicle information based on augmented reality. As an example, the display device 140 may display a vehicle state (eco information and battery state), and region (or country) boundary information based on augmented reality during movement. Furthermore, the display device 140 may display a screen for changing a setting for each function when augmented reality is applied. Furthermore, the display device 140 may display a display object depending on a position and a driving direction of the display object determined by the processor 130 based on augmented reality.

As an example, the display device 140 may be implemented as a head-up display (HUD), a cluster, an audio video navigation (AVN), or a human machine interface (HMI). Furthermore, the display device 140 may include at least one of a liquid crystal display (LCD), a thin film transistor liquid crystal display (TFT LCD or thin film transistor-LCD), a light emitting diode (LED) display, an organic light emitting diode (OLED or organic LED) display, an active OLED (AMOLED or active matrix OLED) display, a flexible display, a bended display, and a 3D display. Some of these displays may be implemented as a transparent display formed of a transparent or translucent type such that the outside may be viewed. Furthermore, the display device 140 may be provided as a touch screen including a touch panel, and may be used as an input device as well as an output device.

Accordingly, according to various exemplary embodiments of the present invention, user recognition may be improved and a sense of heterogeneity may be minimized by accurately selecting a position and displaying fuel efficiency state, driving-related information, regional boundary information, etc., based on augmented reality.

Furthermore, according to various exemplary embodiments of the present invention, user convenience may be improved by supplementing possibility of errors in information which is matched with the real world based on augmented reality and displaying information related to areas that could not be displayed based on augmented reality.

The above description is merely illustrative of the technical idea of the present invention, and those skilled in the art to which various exemplary embodiments of the present invention pertains may make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An economical state display device of a vehicle, the economical state display device comprising:
   a processor configured to display an economical state of the vehicle in augmented reality; and
   a storage configured to store data and algorithms driven by the processor,
   wherein the processor is configured to classify and display objects according to the economical state,
   wherein the processor is disposed within a vehicle or outside the vehicle, and when disposed outside the vehicle, is configured to transmit display information related to the economical state to the vehicle or a mobile device,
   wherein the economical state indicates a level of fuel efficiency of the vehicle, and
   wherein the processor is configured to classify and display at least one of color, shape, type, and size of the objects according to the economical state.

2. The economical state display device of claim 1, wherein the processor is configured to determine the economical state by comparing fuel efficiency of another vehicle and fuel efficiency of the vehicle based on a same vehicle model or a same condition as the vehicle.

3. The economical state display device of claim 2, wherein the another vehicle includes at least one of all vehicles within a predetermined radius or satisfying a predetermined condition, all vehicles in a same country based on a same vehicle type, and vehicles designated with consent of a user.

4. The economical state display device of claim 1, wherein the processor is configured to determine the economical state according to a battery usage state of the vehicle.

* * * * *